(12) United States Patent
Berard et al.

(10) Patent No.: US 9,969,082 B1
(45) Date of Patent: May 15, 2018

(54) ROBOTIC SYSTEMS AND METHODS FOR TASK SCORING AND SELECTION

(71) Applicant: Google Inc., Mountain View, CA (US)

(72) Inventors: Stephen Berard, Burlington, MA (US); Benjamin Swilling, Winchester, MA (US); Matthew Malchano, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 190 days.

(21) Appl. No.: 14/988,390

(22) Filed: Jan. 5, 2016

(51) Int. Cl.
  *G05B 19/04* (2006.01)
  *B25J 9/16* (2006.01)
  *B62D 57/032* (2006.01)

(52) U.S. Cl.
  CPC ............ *B25J 9/163* (2013.01); *B62D 57/032* (2013.01); *Y10S 901/01* (2013.01); *Y10S 901/02* (2013.01); *Y10S 901/27* (2013.01); *Y10S 901/30* (2013.01)

(58) Field of Classification Search
  CPC ...... B25J 9/163; B62D 57/032; Y10S 901/01; Y10S 901/02; Y10S 901/27; Y10S 901/30
  See application file for complete search history.

(56) References Cited

U.S. PATENT DOCUMENTS

| | | | |
|---|---|---|---|
| 6,374,155 B1 | 4/2002 | Wallach et al. | |
| 8,380,348 B2* | 2/2013 | Neki | B25J 19/005 219/125.1 |
| 8,467,596 B2* | 6/2013 | Abadpour | G06T 7/73 348/135 |
| 8,571,706 B2 | 10/2013 | Zhang et al. | |
| 8,965,580 B2 | 2/2015 | Brooks et al. | |
| 2009/0187278 A1* | 7/2009 | Zhuk | G05D 1/0088 700/246 |
| 2010/0217438 A1* | 8/2010 | Kawaguchi | B25J 9/1661 700/248 |
| 2010/0241248 A1* | 9/2010 | Zhang | G05B 19/41885 700/29 |
| 2012/0072023 A1* | 3/2012 | Ota | B25J 9/1664 700/259 |
| 2013/0345875 A1* | 12/2013 | Brooks | B25J 9/0087 700/259 |
| 2015/0239127 A1 | 8/2015 | Barajas et al. | |

OTHER PUBLICATIONS

Semini "Design of HyQ a hydraulically and electrically actuated quadruped robot" Feb. 2011, Systems and control Engineering.*

* cited by examiner

*Primary Examiner* — Rachid Bendidi
(74) *Attorney, Agent, or Firm* — Honigman Miller Schwartz and Cohn LLP

(57) ABSTRACT

The present disclosure relates to methods and systems for improving robotic task selection and execution. An example method includes determining an external environment state based on receiving information indicative of at least one aspect of an environment proximate to a robotic system having at least one actuator. The method also includes optionally determining a goal to be accomplished by a robotic system and determining a plurality of possible tasks each including at least one task involving the at least one actuator that may be carried out by the robotic system in pursuance of the goal. For each possible task group, the method includes determining a respective task group score based on an expected performance capability. The expected performance capability is based, at least in part, on the external environment state. The method includes selecting a task group based on the respective task group scores.

23 Claims, 12 Drawing Sheets

Oblique View

ROBOTIC SYSTEMS AND METHODS FOR TASK SCORING AND SELECTION

BACKGROUND

Robotic systems, or simply robots, may include at least one actuator, at least one sensor, and a power source. In some cases, robots may navigate and interact with their environment. For example, robots may carry out tasks so as to accomplish a goal.

SUMMARY

In an aspect, a robotic system is provided. The robotic system includes at least one actuator, a memory configured to contain instructions, and a processor. The processor is configured to execute the instructions to perform operations. The operations include determining an external environment state based on receiving information indicative of at least one aspect of an environment proximate to the robotic system. The operations also include determining a plurality of possible task groups to be carried out by the robotic system in pursuance of a goal. Each possible task group includes at least one task involving the at least one actuator. The operations further include determining, for each possible task group, a respective task group score based on an expected performance capability when carrying out the at least one task involving the at least one actuator. The expected performance capability is based on the external environment state and an attribute of the at least one actuator. The operations yet further include selecting a task group from the plurality of possible task groups based on the plurality of task group scores. The operations additionally include causing the robotic system to carry out the selected task group.

In an aspect, a method is provided. The method includes determining, by a processor of a robotic system, an external environment state based on receiving information indicative of at least one aspect of an environment proximate to the robotic system. The robotic system includes at least one actuator. The method additionally includes determining a plurality of possible task groups to be carried out by the robotic system in pursuance of a goal. Each possible task group includes at least one task involving the at least one actuator. The method yet further includes determining, for each possible task group, a respective task group score based on an expected performance capability when carrying out the at least one task involving the at least one actuator. The expected performance capability is based on the external environment state and an attribute of the at least one actuator. The method also includes selecting a task group from the plurality of possible task groups based on the plurality of task group scores. The method yet further includes causing the robotic system to carry out the selected task group.

Other aspects, embodiments, and implementations will become apparent to those of ordinary skill in the art by reading the following detailed description, with reference where appropriate to the accompanying drawings.

DETAILED DESCRIPTION

I. Overview

The present disclosure relates to methods and systems for robotic task selection and execution. More specifically, robotic tasks may be organized in an integrated manner, where the various elements of the robot are coordinated such that strengths of some elements may be used to compensate for the weaknesses of other elements. For example, if a body of a robot is able to move toward a target position faster than an arm of the robot moving alone, the body can move to get the arm relatively close to where it needs to be, and the arm can do final adjustments.

Put another way, a robotic system may select between different ways to accomplish a goal. For example, a biped robot may have a goal of grasping an object within a reach radius of an arm. In such a scenario, the biped robot may determine multiple ways to accomplish the goal. For example, the biped robot may reach out its arm and grasp the object. Alternatively, the biped robot may move its legs to move closer to the object before grasping the object with its gripper. As another alternative, the biped robot may lean with its torso and then grasp the object.

Each group of possible tasks (e.g., a possible task group) may be associated with a task group score. The task group score may relate to the speed, efficiency, and/or safety related to carrying out the tasks of the possible task group. That is, some ways of pursuing the goal may be faster, more efficient, and/or safer than other ways to pursue the goal. The respective task group scores may be compared and a task group may be selected based on the comparison (e.g., highest task group score or lowest task group score).

The described systems and methods may provide ways to score and select between different tasks and/or task groups in furtherance of accomplishing a goal with a robotic system. Under the above scenario, the relative performance capabilities of a given robotic appendage may be quantified and compared with the performance capabilities of another robotic appendage. For example, the systems and methods described herein may provide better task selection and robotic control. Such systems and methods may provide for optimizing and/or balancing various factors such as safety, efficiency, and speed in pursuance of a given goal.

II. Example Systems

Figure 1:
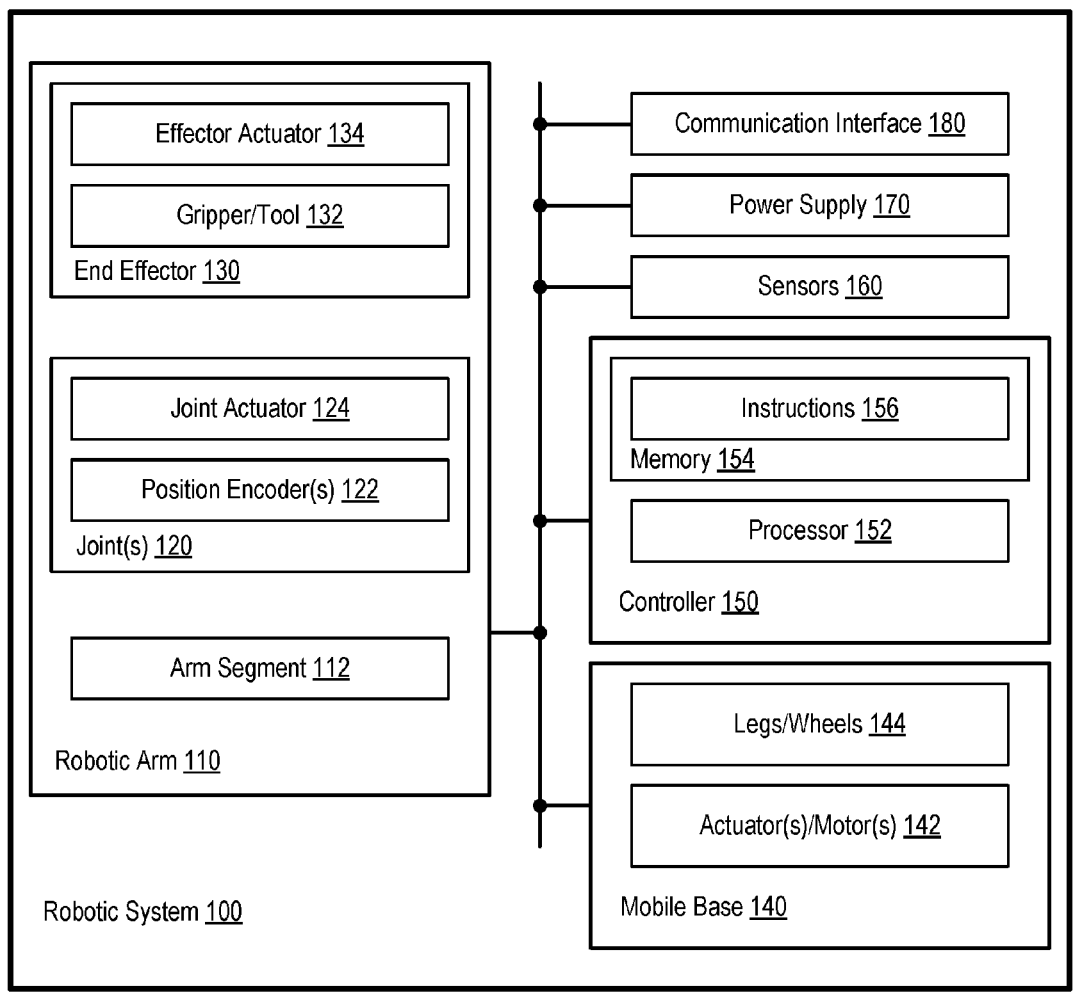
FIG. 1 is a schematic diagram of a robotic system, according to an example embodiment.

FIG. 1 is a schematic diagram of a robotic system 100, according to an example embodiment. The robotic system 100 may include at least one robotic arm 110, a mobile base 140, a controller 150, sensors 160, a power supply 170, and a communication interface 180.

In an example embodiment, the robotic arm 110 may include a plurality of arm segments 112. In such a scenario, the arm segments 112 may be coupled via one or more joints 120. The one or more joints 120 may include at least one joint actuator 124 and at least one position encoder 122. In some embodiments, the robotic arm 110 may include an end effector 130. As such, the end effector 130 may be arranged with a gripper/tool 132. The gripper/tool 132 may be operated by adjusting at least one effector actuator 134.

In some embodiments, the mobile base 140 may include legs/wheels 144 and at least one corresponding actuator/motor 142. In such a scenario, the mobile base 140 may be operable to move the robotic system 100 via one or more wheels and/or one or more legs. Other types of mobile bases are contemplated, including those associated with flying, floating, hovering, or rail-based robotic systems.

Controller 150 includes one or more processors 152 and a memory 154. In an example embodiment, the one or more processors 152 may include one or more general purpose processors (e.g., microprocessors) and/or one or more special purpose processors—e.g., digital signal processors (DSPs), graphics processing units (GPUs), floating point units (FPUs), network processors, or application-specific integrated circuits (ASICs). Additionally or alternatively, the controller 150 may include at least one programmable in-circuit serial programming (ICSP) microcontroller.

The memory 154 may include volatile and/or non-volatile storage components, such as optical, magnetic, organic, or other memory or disc storage, which may be integrated in whole or in part with the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

While FIG. 1 illustrates the controller 150 as being schematically apart from various other elements of the robotic system 100, the controller 150 may be physically located at, or incorporated into, one or more elements of robotic system 100. For example, the controller 150 may be incorporated into the robotic arm 110. Alternatively, the controller 150 may be incorporated into the mobile base 140. Yet further, the controller 150 may be distributed among at least two elements of the robotic system 100. In another embodiment, the controller 150 may include a distributed computing network and/or a cloud computing network.

The controller 150 may be communicatively coupled to various other elements of robotic system 100 via a communication interface 180. Additionally or alternatively, the communication interface 180 may be operable to establish a wireless communication link with another robotic system, a remote computer, or a remote network.

The communication interface 180 may include one or more wireless interfaces and/or one or more wired interfaces, which allow the controller 150 to communicate with the other elements of robotic system 100 or other systems via one or more networks. In an example embodiment, wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other type of physical connection. The communication interface 180 may additionally or alternatively include one or more routers, switches, and/or other devices or networks.

The sensors 160 may include one or more of: a position encoder, a pressure sensor, LIDAR, RADAR, an ultrasonic rangefinder, a microphone, a camera, an inertial navigation system (INS), a global positioning system (GPS), or another type of sensor. The sensors 160 may provide information indicative of a position of the robotic system 100. Additionally or alternatively, the sensors 160 may provide information indicative of other aspects of an environment proximate to the robotic system 100. For example, the sensors 160 may provide information about obstacles (e.g., walls, stairs, closed doors, etc.), objects (e.g., chair, end table, rug, etc.), or living beings (e.g., human, dog, cat, hamster, etc.) around the robotic system 100. The sensors 160 may also be configured to provide information indicative of an operating constraint, such as a speed limit, noise limit, boundary, or another type of constraint with respect to robotic operations.

Additionally or alternatively, the sensors 160 may provide information about a pose or position of one or more elements of the robotic system 100. For example, a plurality of position encoders associated with the robotic arm 110 may provide information about a current position of the end effector 130 of the robotic arm 110. Additionally or alternatively, a pressure sensor associated with a gripper/tool 132 may provide information about a grip pressure of an object being held by the end effector 130. In some embodiments, the sensors 160 may provide information about a center of gravity of the robotic system 100 and/or information about the balance of the robotic system 100.

In an example embodiment, the power supply 170 may include a battery configured to provide electrical power. For example, the battery may include one or more lithium ion batteries. Additionally or alternatively, the power supply 170 may include a hydrocarbon fuel (e.g., gasoline) and at least one internal combustion engine. Yet further, the power supply 170 may include photocells (e.g., solar panels). Other types of power supplies are contemplated within the scope of the present disclosure.

The memory 154 may be configured to store computer-readable program instructions 156. Furthermore, the one or more processors 152 may be configured to execute the instructions 156 so as to carry out various operations described herein.

In an example embodiment, the processor 152 may be operable to receive information from the sensors 160. The received information may be indicative of one or more aspects of an environment proximate to the robotic system 100. Based on the received information, the processor 152 may determine an external environment state. The external environmental state may include one or more obstacles, objects, and/or living persons. In an example embodiment, the external environmental state may include a map of solid objects and/or movement boundaries. Additionally or alternatively, the external environmental state may include one or more operating constraints. The one or more operating constraints may include a speed limit or range, a rate limit or range, etc. It is understood that a wide variety of operating constraints regarding robotic behavior are possible. All such operating constraints are contemplated within the scope of the present disclosure.

The processor 152 may be optionally configured to determine a goal to be accomplished by the robotic system 100.

For example, the processor 152 may determine a goal via human input or a higher level goal determination process. Other ways of determining a goal are possible. In some embodiments, the goal may be determined before carrying out other blocks or steps described herein. Additionally or alternatively, the goal may be determined and/or adjusted "on the fly" while the robotic system 100 is carrying out the blocks or steps described herein. The processor 152 is operable to determine a plurality of possible task groups to be carried out by the robotic system 100 in pursuance of the goal. At least one task of each possible task group involves at least one actuator of the robotic system 100 (e.g. effector actuator 134).

As used herein, possible task groups that may be carried out "in pursuance of the goal" may include tasks/actions that could at least temporarily move the robotic system physically away from a particular goal location. For example, in order to move to a goal location, a robotic system may determine possible task groups that move the robot further away from the goal location so as to avoid obstacles, objects, or living beings. Other reasons for moving, at least temporarily, further away from the goal location are possible.

The processor 152 may be operable to determine, for each possible task group of the plurality of possible task groups, a respective task group score based on an expected performance capability when carrying out the respective possible task involving the at least one actuator. The at least one actuator may include at least one of: a linear actuator or a rotational actuator. In some embodiments, the least one actuator may be incorporated into a robotic appendage such as a robotic arm or a robotic leg.

The processor 152 may be configured to compare the task group scores for each possible task group. The processor 152 may, based on the comparison, select a task group from the plurality of possible task groups. For example, the selected task group may have the highest or lowest task group score from the plurality of task group scores. Additionally or alternatively, the selected task group may have a relatively higher or lower task group score compared to other task groups. Additionally, the processor 152 may be operable to cause the robotic system to carry out the selected task group.

Figure 2:
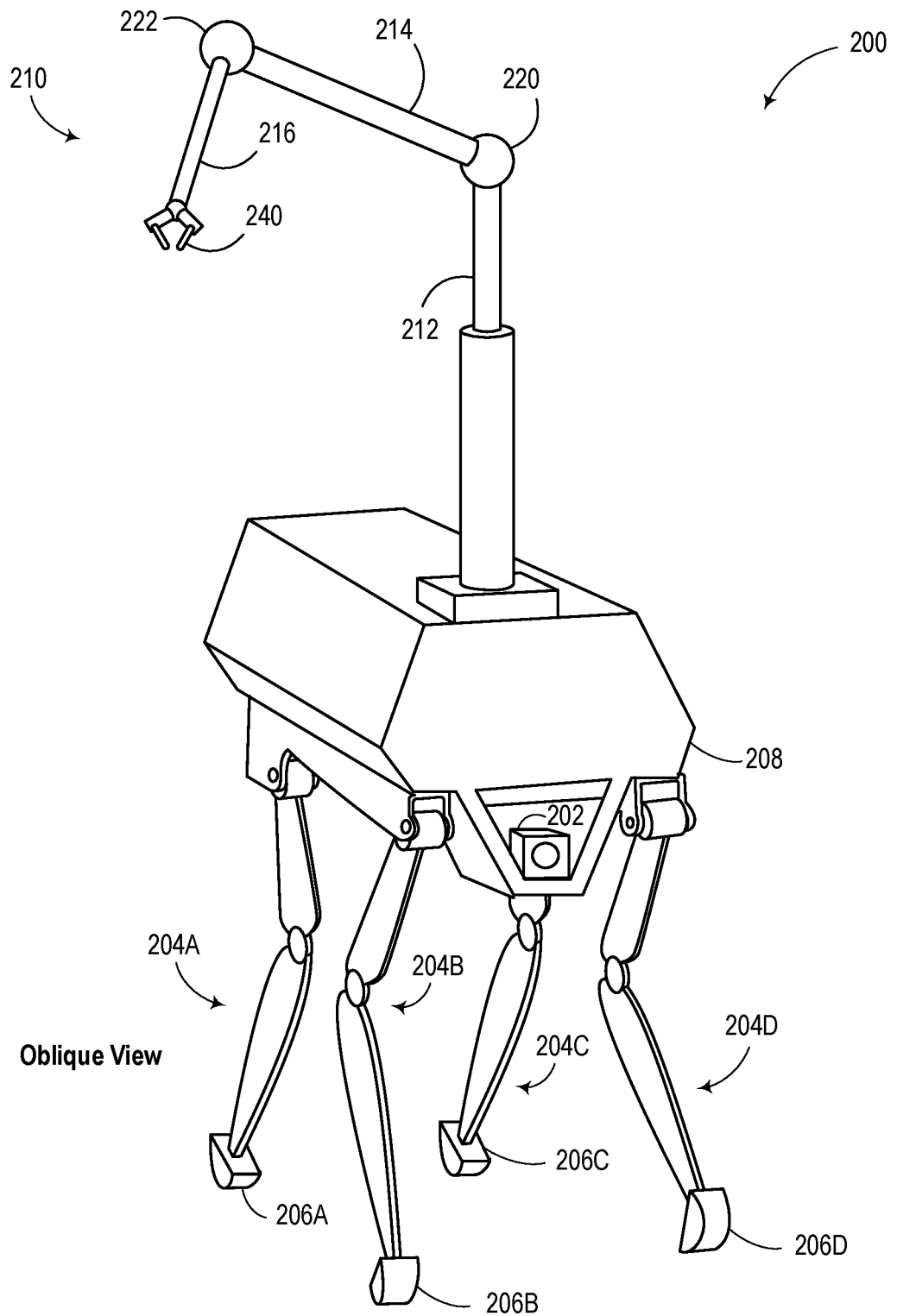
FIG. 2 illustrates a robotic system, according to an example embodiment.

FIG. 2 illustrates an oblique view of a robotic system 200, according to an example embodiment. Robotic system 200 may be arranged as a quadruped robot. In other words, robotic system 200 may have four legs 204A-D, each leg having a respective foot 206A-D. The legs 204A-D may provide a mobile base for a body 208 of the robotic system 200.

The robotic system 200 may include any of the subsystems or elements described herein. For instance, robotic system 200 may include similar or identical elements as illustrated and described in reference to FIG. 1. In an example embodiment, the robotic system 200 may include a camera 202.

The robotic system 200 may include at least one robotic arm 210. The robotic arm 210 may include a plurality of arm segments 212, 214, and 216. The arm segments may be coupled via articulable joints 220 and 222. Furthermore, the robotic arm 210 may be arranged with a gripper 240. The robotic arm 210 may have a reach radius based at least on a range of motion of the joints and a length of each respective arm segment. The robotic system 200 may have a center of gravity based at least on a pose of the legs 204A-D and the robotic arm 210.

Figure 3:
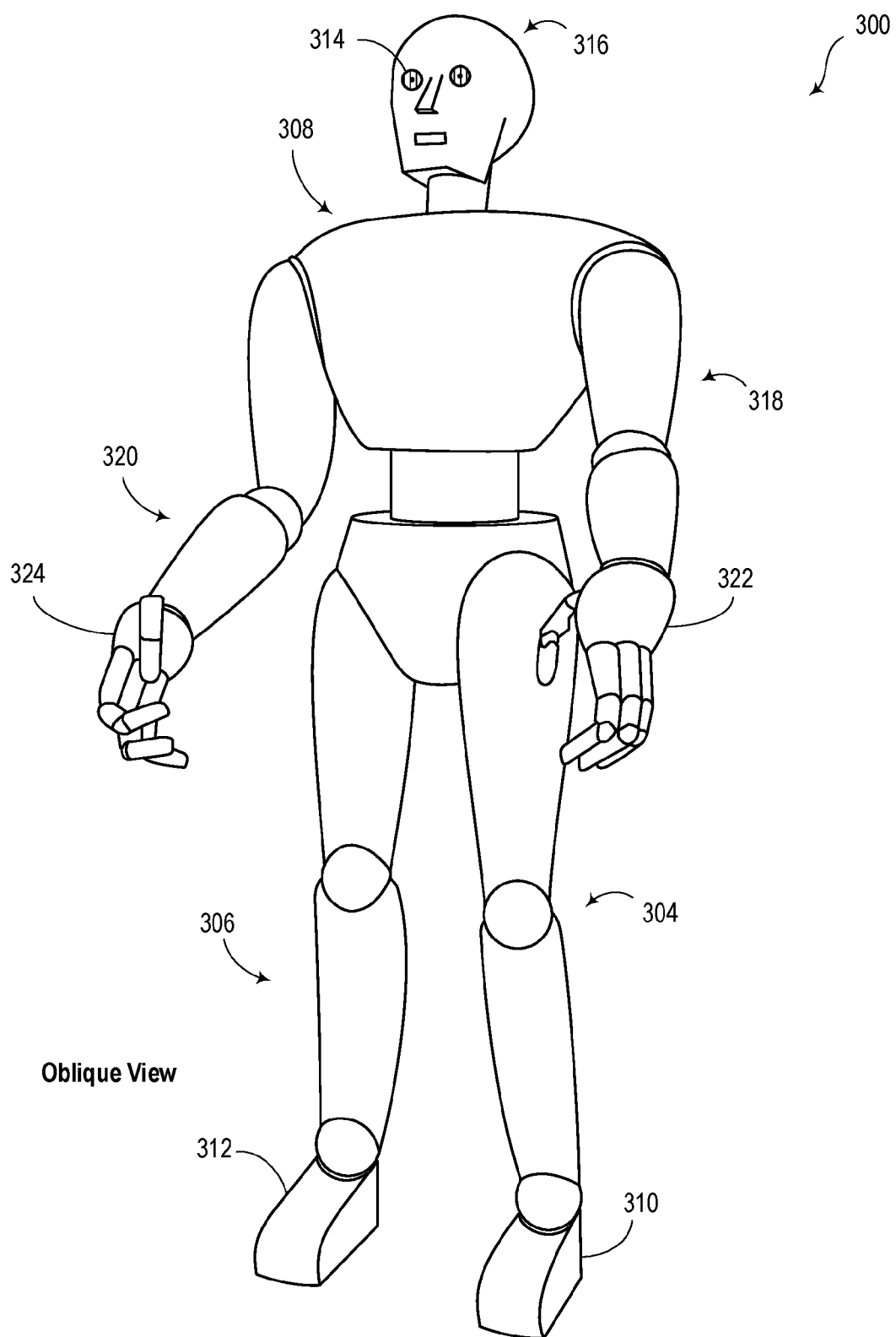
FIG. 3 illustrates a robotic system, according to an example embodiment.

FIG. 3 illustrates an oblique view of a robotic system 300, according to an example embodiment. The robotic system 300 may be arranged as a biped robot. That is, the robotic system 300 may include two legs 304 and 306, each leg having a respective foot 310 and 312. The legs 304 and 306 may provide a mobile base for a torso 308.

The robotic system 300 may also include two arms 318 and 320 coupled to the torso 308, each arm having a respective hand 322 and 324. The hands 322 and 324 may be operable to grasp and/or lift objects. The robotic system 300 may include a head 316 coupled to the torso 308.

The robotic system 300 may include any of the subsystems or elements described herein. For instance, robotic system 300 may include similar or identical elements as illustrated and described in reference to FIG. 1. In an example embodiment, the robotic system 300 may include sensors such as camera 314.

The robotic system 300 may have a reach radius based at least on a range of motion of the joints and a length of each respective arm segment of arms 320 and 318. The robotic system 300 may have a center of gravity based at least on a pose of the legs 304 and 306, the torso 308, and the arms 318 and 320.

Figure 4:
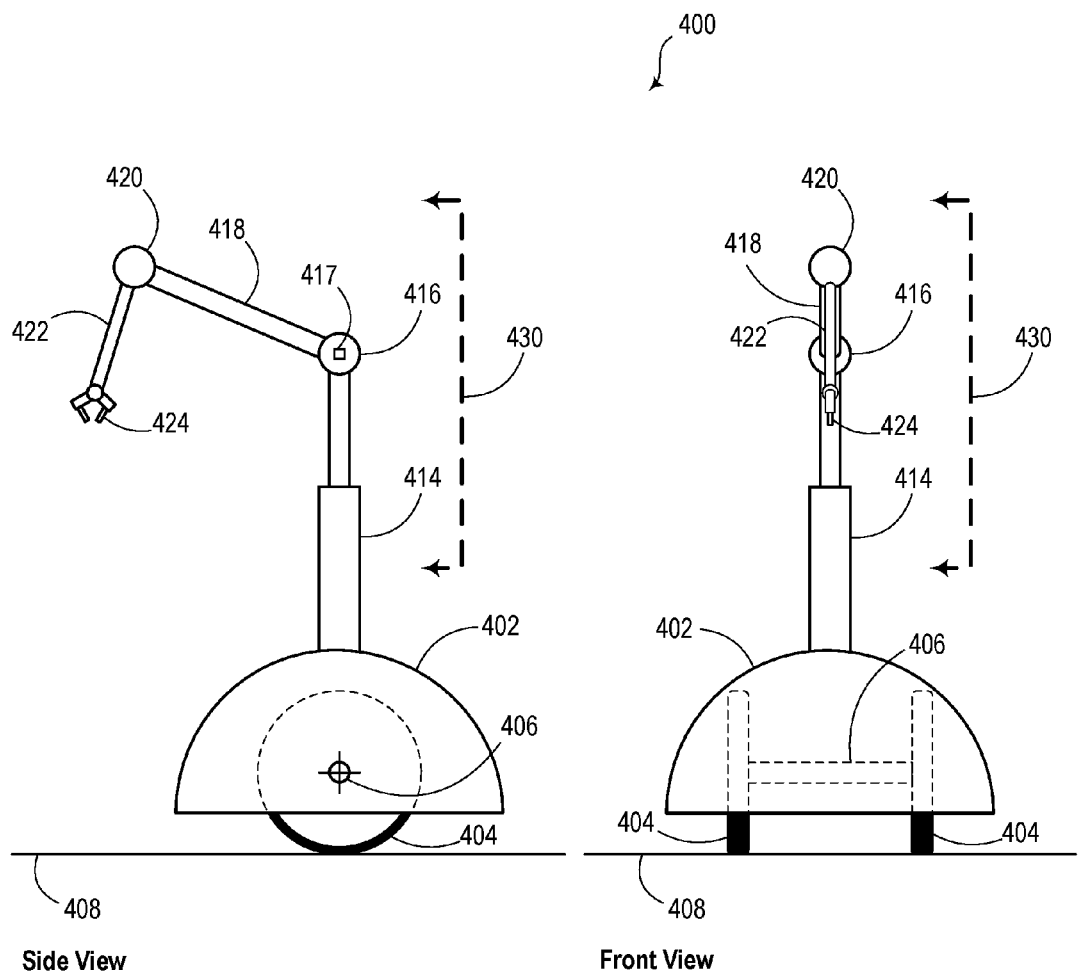
FIG. 4 illustrates a robotic system, according to an example embodiment.

FIG. 4 illustrates side and front views of a robotic system 400, according to an example embodiment. The robotic system 400 includes a mobile base 402. The mobile base 402 includes wheels 404, which may be coupled via an axle 406. The wheels 404 may be configured to roll along a ground surface 408.

The robotic system 400 may include at least one robotic arm 430. The robotic arm 430 may include a plurality of arm segments 414, 418, and 422. The arm segments may be coupled via joints 416 and 420. In an example embodiment, the joints 416 and 420 may include at least one sensor configured to provide information indicative of a pose of the robotic arm 430 such as angle encoder 417. The robotic arm 430 may include an end effector 424, such as a gripper.

The robotic system 400 may have a reach radius based at least on a range of motion of the joints 416 and 420 and a length of each respective arm segment of arms 414, 418, and 422. The robotic system 400 may have a center of gravity based at least on a pose of the robotic arm 430.

Figure 5:
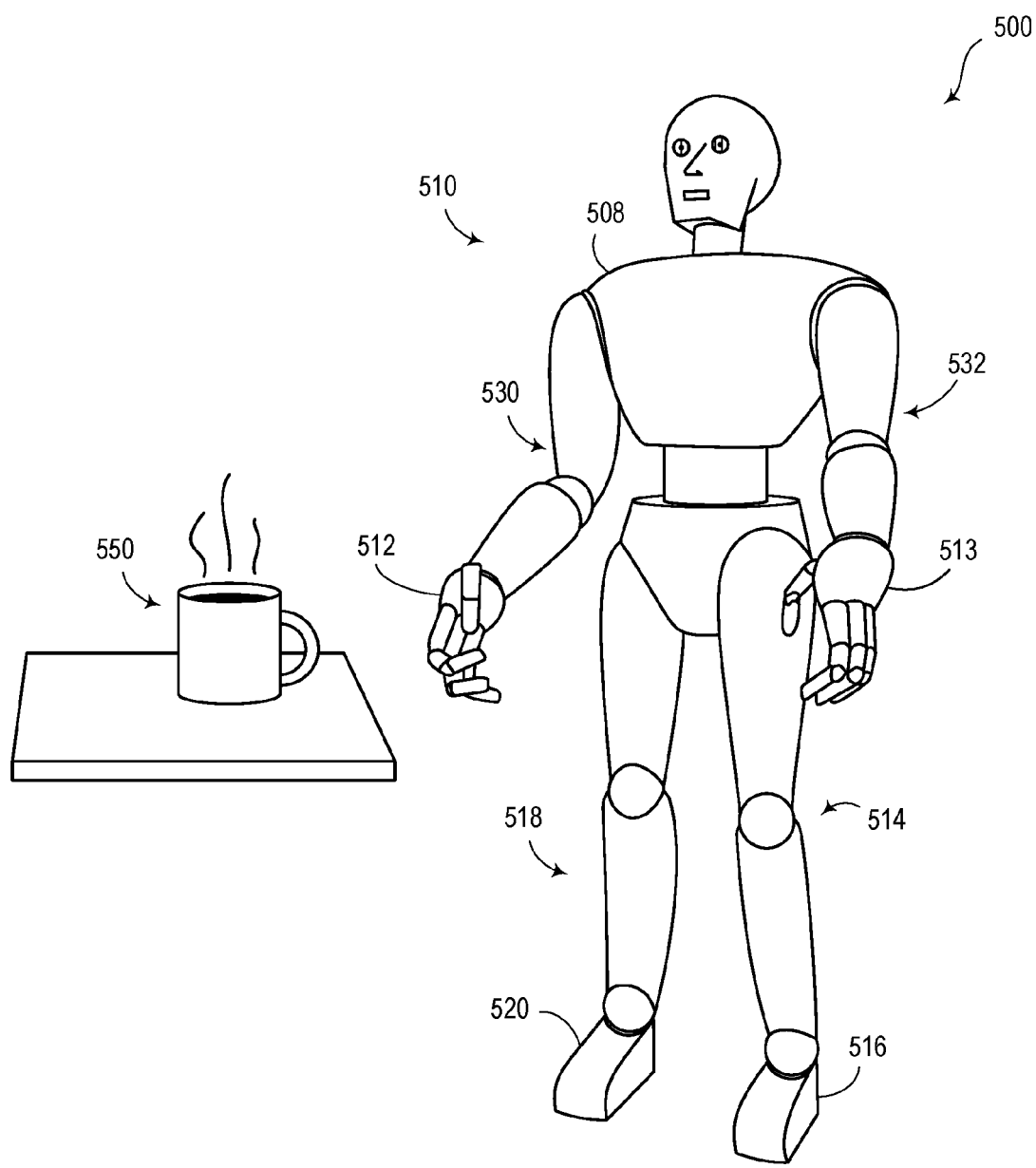
FIG. 5 illustrates a robotic system in scenario, according to an example embodiment.

FIG. 5 illustrates a robotic system 510 in scenario 500, according to an example embodiment. Scenario 500 may include the robotic system 510 as being near (e.g., within a reach radius) of a target object 550. In an example embodiment, the target object 550 may include an object to be grasped or gripped (e.g., a cup). Other types of target objects are contemplated herein.

The robotic system 510 may be similar or identical to robotic systems 100 and 300 as illustrated and described in reference to FIGS. 1 and 3. For example, robotic system 510 may include two legs 514 and 518, each having respective feet 516 and 520. Furthermore, robotic system 510 may include a torso 508 coupled to arms 530 and 532. The arms may include respective hands 512 and 513.

As illustrated, the robotic system 510 may include a biped robot, such as robotic system 300 as illustrated and described in reference to FIG. 3. However, other types of robotic systems are possible within the scope of the present disclosure.

In an example embodiment, robotic system 510 may include a processor configured to carry out operations. Some examples of the operations are illustrated and described in reference to FIGS. 6 and 7A-7E.

Figure 6:
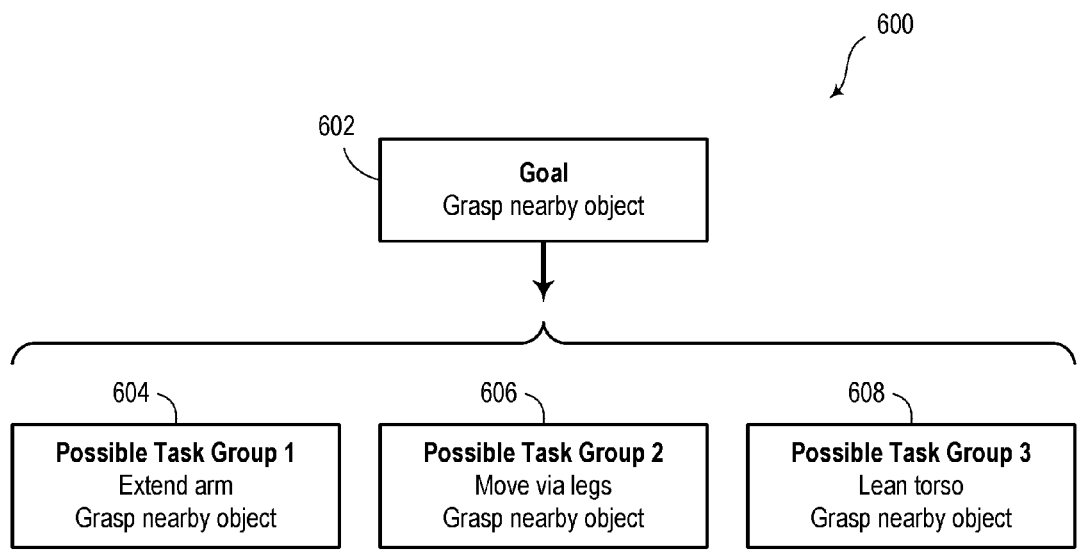
FIG. 6 is a block diagram, according to an example embodiment.

FIG. 6 is a block diagram 600, according to an example embodiment. In such a scenario, a processor (e.g., processor 152) may be operable to determine a goal 602 to be accomplished by the robotic system (e.g., robotic system 510). For example, the goal 602 may be determined to be to grasp a nearby object (e.g., grasp target object 550 with hand 512). Any number of other goals may be determined within the operational capabilities of the robotic system 510.

The processor may also be operable to determine a plurality of possible task groups to be carried out by the robotic system in pursuance of the goal. At least one task of each of the possible task groups involves at least one actuator of the robotic system. For example, in the scenario 500, the processor of the robotic system 510 may determine three possible task groups (each involving at least one actuator of the robotic system 510) that may be performed in furtherance of the goal.

As illustrated in block 604, possible task group 1 may include the tasks of: extending the arm 530 and grasping the target object 550 with hand 512.

As illustrated in block 606, possible task group 2 may include the tasks of: moving via legs 514 and 518 and then grasping the target object 550 with hand 512.

As illustrated in block 608, possible task group 3 may include the tasks of: leaning torso 508 and then grasping the target object 550 with hand 512.

All three of the possible task groups may involve at least one actuator of the robotic system. For example, possible task group 2 may involve a plurality of actuators associated with the legs 514 and 518, the arm 530, and the hand 512 of the robotic system 510. The performance of each of the plurality of associated actuators may be considered as described elsewhere herein.

Figure 7A:
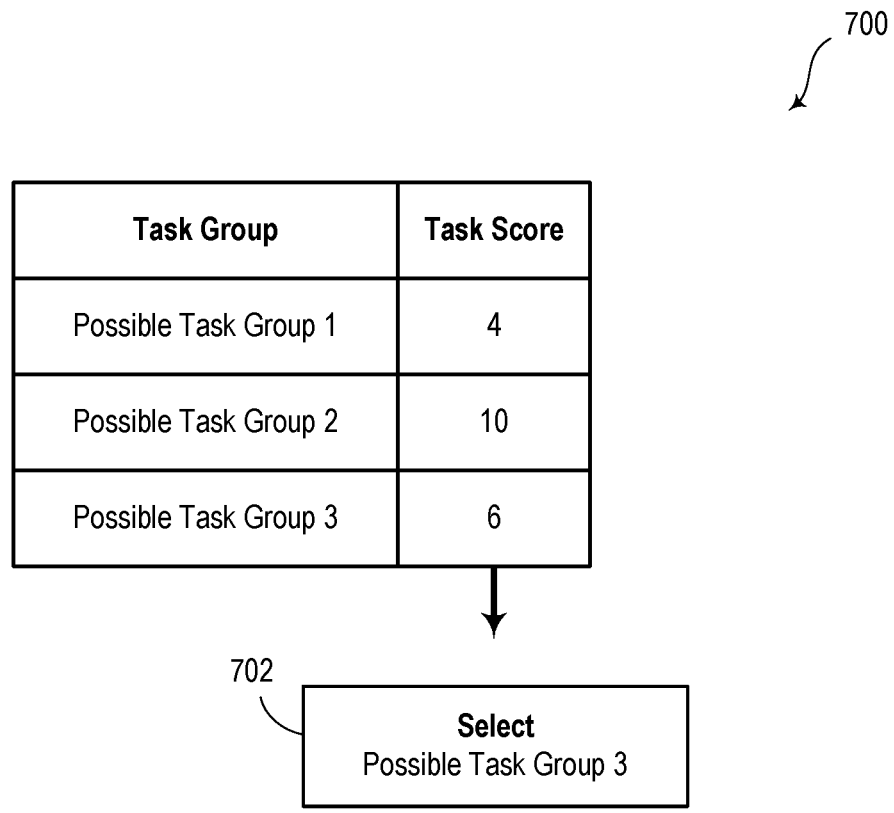
FIG. 7A illustrates a task selection operation, according to an example embodiment.

FIGS. 7A-7E illustrate various examples of task selection operations. FIG. 7A illustrates a task selection operation 700, according to an example embodiment. In reference to scenario 500, the processor of robotic system 510 may be operable to, for each possible task group of the plurality of possible task groups, determine a respective task score based on an expected performance capability when carrying out the respective possible task. That is, for each possible task group 1-3 (604, 606, and 608), the processor may determine a task group score that may be based, for example, on a performance characteristic of the actuator(s) involved in the possible task group.

In an example embodiment, the task group score may also be based on an external environmental state and/or a robot state. For example, the external environmental state may include, or be based on, one or more objects, obstacles, living beings (e.g., humans), and/or other movement boundaries. Additionally or alternatively, the external environmental state may be based on one or more constraints to robotic behavior.

The robot state may include one or more aspects or attributes related to the robotic system. For example, the robot state may be based on an amount of charge remaining in a robot power source. The robot state may alternatively or additionally be based on an operating temperature, a pose, or a combination of actuators operable by the robotic system. The robot state may be based on a variety of other factors that may affect a performance of a robotic system. All such other factors are contemplated herein.

Furthermore, the expected performance capability may be based on a variety of known or predicted characteristics of the actuator(s). For example, the expected performance capability may relate to an attribute of the actuator(s). A non-limiting set of possible attributes may include: a strength of the actuator(s), a range of motion of the actuator(s), an accuracy of the actuator(s), or a speed of the actuator(s).

In some example embodiments, the respective task group score may be assigned according to a sum of squares (SoS) algorithm. For example, while determining the respective task group scores, numerical values may be assigned to each possible task group based on their respective expected performance capabilities according to the SoS algorithm. Other algorithms or formulae are possible in assigning the respective task group scores.

As an example, the task group score may be determined based on a length of time needed to carry out the given task group (e.g., a task group duration). In such a scenario, accomplishing the goal of grasping target object 550 via possible task group 1 may take the longest duration of the three task groups at least because the actuators associated with arm 530 may optimized for precision movement rather than speed. As an example, the robotic system may predict that execution of possible task group 1 may have a task group duration of 10.5 seconds. As such, possible task group 1 may be determined to have a task score of 4. As described herein, task scores are for illustrative purposes only and may have other values.

Furthermore, possible task group 2 may take the shortest duration because it utilizes a mobile base (e.g., the legs 514 and 518) to move toward the target object 550 before grasping it. That is, the robotic system (e.g., the processor) may determine that possible task group 2 may have a predicted task group duration of 5.2 seconds. As such, task group 2 may be determined to have a task score of 10. Task group 3 may have a task group duration between the two other possible task groups (e.g., 7.5 seconds) and thus, task group 3 may be determined to have a task score of 6.

In some embodiments, determining the respective task group score may be additionally or alternatively based on at least one of: a machine learning process or an empirical scoring process. For example, the operations may include algorithms that may learn from and/or make predictions based on data. As such, the robotic system may take action in response to contextual and/or situational stimuli without being explicitly programmed for such specific scenarios.

In an example embodiment, the processor (e.g., processor 152) may be configured to compare the task group scores for each possible task group of the plurality of possible task groups. In reference to FIG. 7A, the comparison between possible task groups 1-3 may include comparing the values 4, 10, and 6, respectively.

The processor may, based on the comparison, select a task group from the plurality of possible task groups. For example, again in reference to FIG. 7A, the selected task group may include possible task group 3. Furthermore, the processor may be operable to cause the robotic system to carry out the selected task group.

In some embodiments, the respective task group scores may be determined based on various factors. For example, the various factors may include a speed factor, a safety factor, and/or a cost factor.

In an example embodiment, the speed factor may include at least one of: a duration of the possible task group or a route of the robotic system while carrying out the possible task group. The safety factor may include at least one of: a safety margin, a proximity to at least one bystander, or a stability of the robotic system while carrying out the possible task group. The cost factor may include at least one of: an energy cost associated with the robotic system carrying out the possible task or a monetary cost associated with the robotic system carrying out the possible task group. In some embodiments, the speed, safety, and/or cost factors may be based on an external environment state. That is, the speed, safety, and/or cost factors may include information indicative of at least one aspect of an environment proximate to the robotic system. Other factors and/or scoring considerations are possible.

Figure 7B:
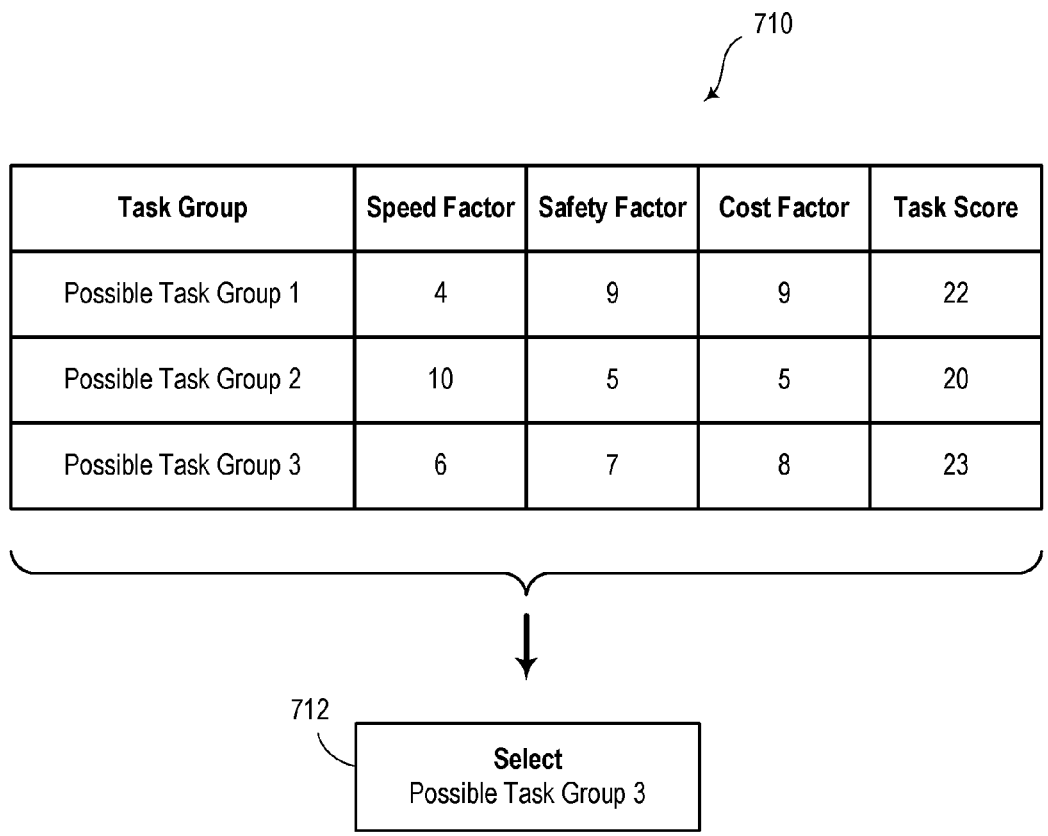
FIG. 7B illustrates a task selection operation, according to an example embodiment.

FIGS. 7B-7E illustrate scenarios in which the speed, safety, and cost factors are considered. FIG. 7B illustrates a task selection operation 710, according to an example embodiment. Again in reference to the possible task groups 1-3, various amounts may be associated with each of the speed, safety, and cost factors for the respective task groups. For example, possible task group 1 may be determined to have a speed factor value of 4, again due to the relatively slow rate of motion of the actuators associated with the robotic arm. The safety factor of possible task group 1 may be 9 because slowly reaching an arm out may be less dangerous to bystanders than other ways to accomplish the goal of grasping the target object. Furthermore, the cost factor of possible task group 1 may be 9 because the energy needed to drive the arm actuators may be low in relation to the other ways to position the robotic hand.

With regard to possible task group 2, the speed factor may be determined to be 10 at least because using a mobile base (e.g., the legs) to move towards the target object 550 may be relatively the fastest way to accomplish the goal. The safety factor for possible task group 2 may be 5 as moving the mobile base toward the target object 550 may be relatively more dangerous for possible bystanders. The cost factor for possible task group 2 may be determined to be 5 because it may require relatively more energy to move the entire weight of the robotic system as compared to reaching out an arm.

The speed factor for possible task group 3 may be determined to be 6 as leaning a torso portion towards the target object and grasping it may take an intermediate amount of time as compared to possible task groups 1 and 2. Furthermore, the safety factor for possible task group 3 may be 7 as leaning a torso may be more safe with respect to possible bystanders, but such an action may move a center of gravity of the robotic system towards an unbalanced condition. That is, leaning the torso may increase a likelihood of the robotic system tipping over. The cost factor for the possible task group 3 may be 8 as it may take slightly more energy to tilt the torso as compared to reaching with an arm.

In an example embodiment, the values from each of the speed, safety, and cost factors may be summed to provide a task group score for each possible task group. The respective task group scores may be compared and a task or task group may be selected at least based on the comparison. For example, the selected task 712 may be possible task group 3 because it has the highest aggregate task score.

Figure 7C:
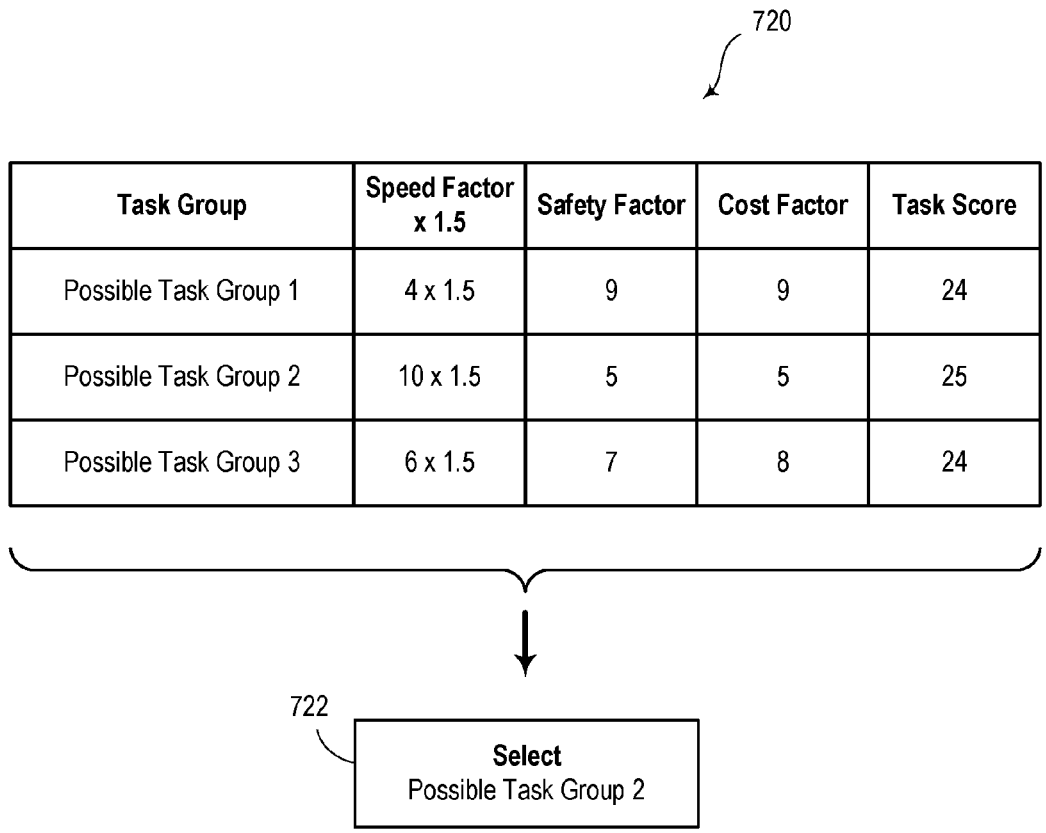
FIG. 7C illustrates a task selection operation, according to an example embodiment.

In some embodiments, one or more factors may be considered with greater weight or importance as compared to other factors. For example, FIG. 7C illustrates a task selection operation 720, according to an example embodiment. Task selection operation 720 includes providing a "weight" or multiplier of 1.5 for the speed factor. In other words, the speed factor is considered with 50% more weight as compared to the safety and cost factors. Accordingly, the selected task group 722 may include possible task group 2.

Figure 7D:
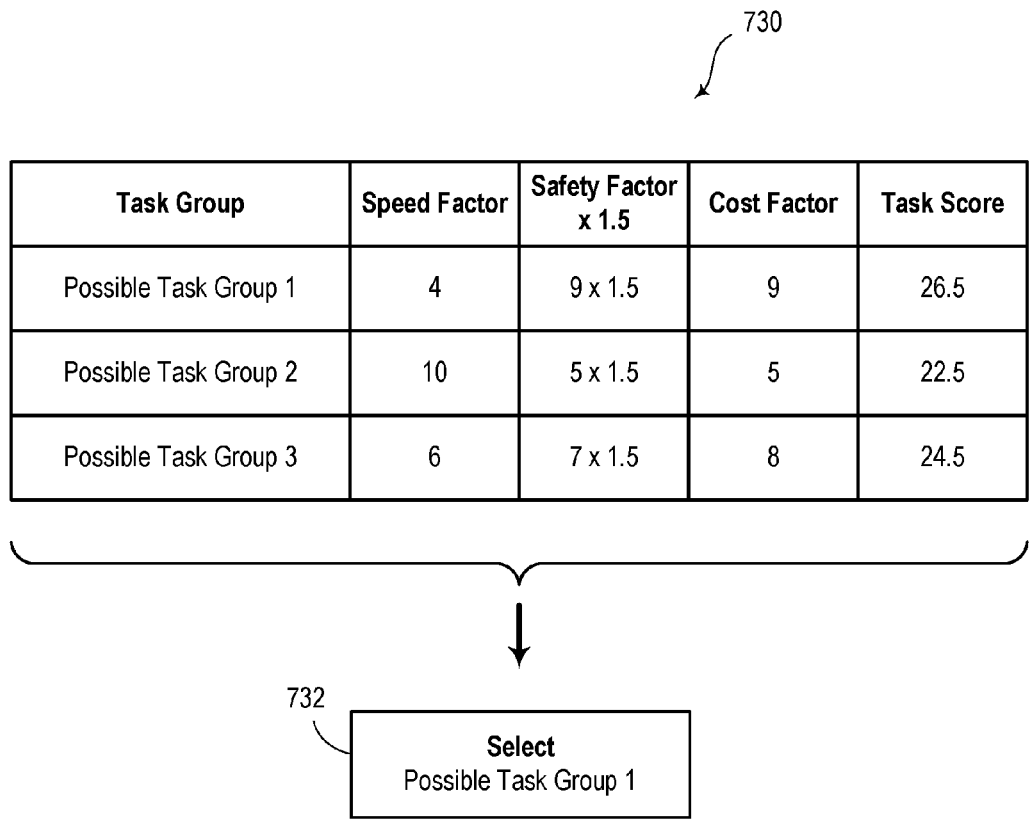
FIG. 7D illustrates a task selection operation, according to an example embodiment.

Furthermore, FIG. 7D illustrates a task group selection operation 730, according to an example embodiment. Task group selection operation 730 includes providing a "weight" or multiplier of 1.5 for the safety factor. In other words, the safety factor is considered with 50% more weight as compared to the speed and cost factors. Accordingly, the selected task group 732 may include possible task group 1.

Figure 7E:
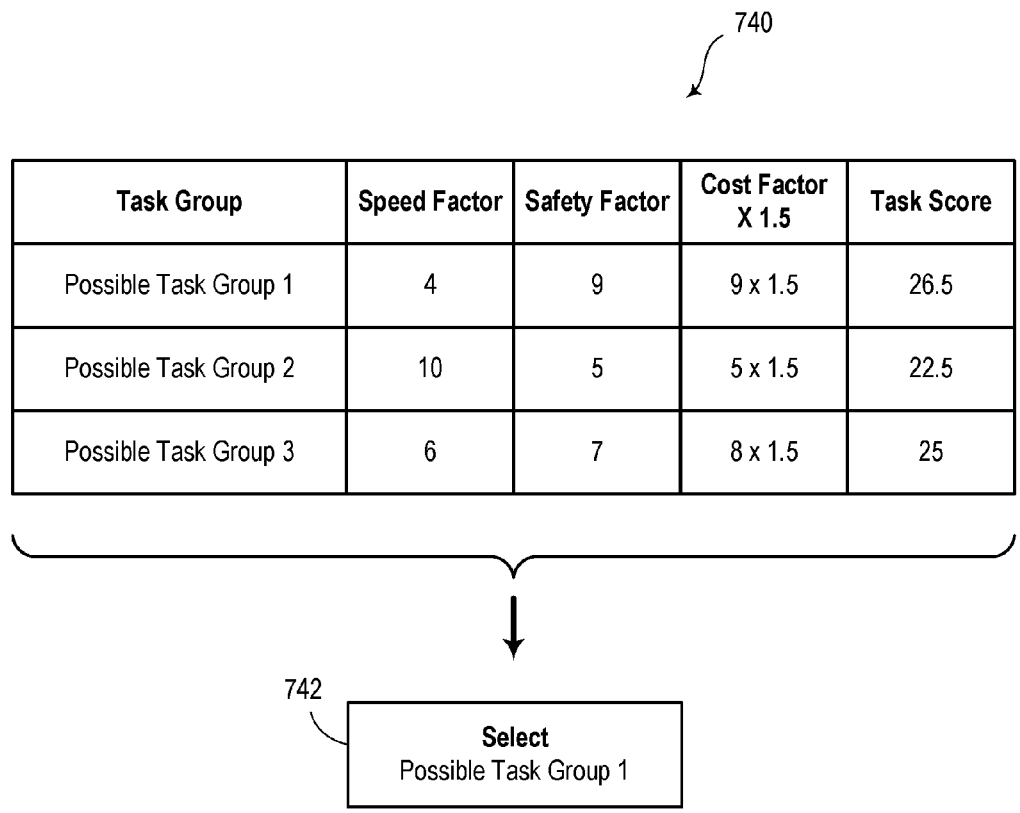
FIG. 7E illustrates a task selection operation, according to an example embodiment.

Yet further, FIG. 7E illustrates a task group selection operation 740, according to an example embodiment. Task group selection operation 740 includes providing a "weight" or multiplier of 1.5 for the cost factor. In other words, the safety factor is considered with 50% more weight as compared to the speed and cost factors. Accordingly, the selected task group 742 may include possible task group 1.

Some example embodiments may include determining one or more possible task groups based at least on the respective task group involving one or more degrees of freedom. For example, a first possible task group may include actuators and/or appendages moving along a first plane of motion (e.g., a vertical plane) and a second possible task group may include actuators and/or appendages moving along a second plane of motion (e.g., a horizontal plane). Other example embodiments may include determining and/or partitioning possible task groups based on other degrees of freedom.

Other ways to select tasks groups are possible within the scope of this disclosure. For example, different weights, averages, or other values could be associated with the various attributes, factors, or other considerations of each task or task group. Accordingly, the systems and methods described herein may accommodate a wide range of context or scenario-dependent considerations in selecting an appropriate task or task group.

III. Example Methods

Figure 8:
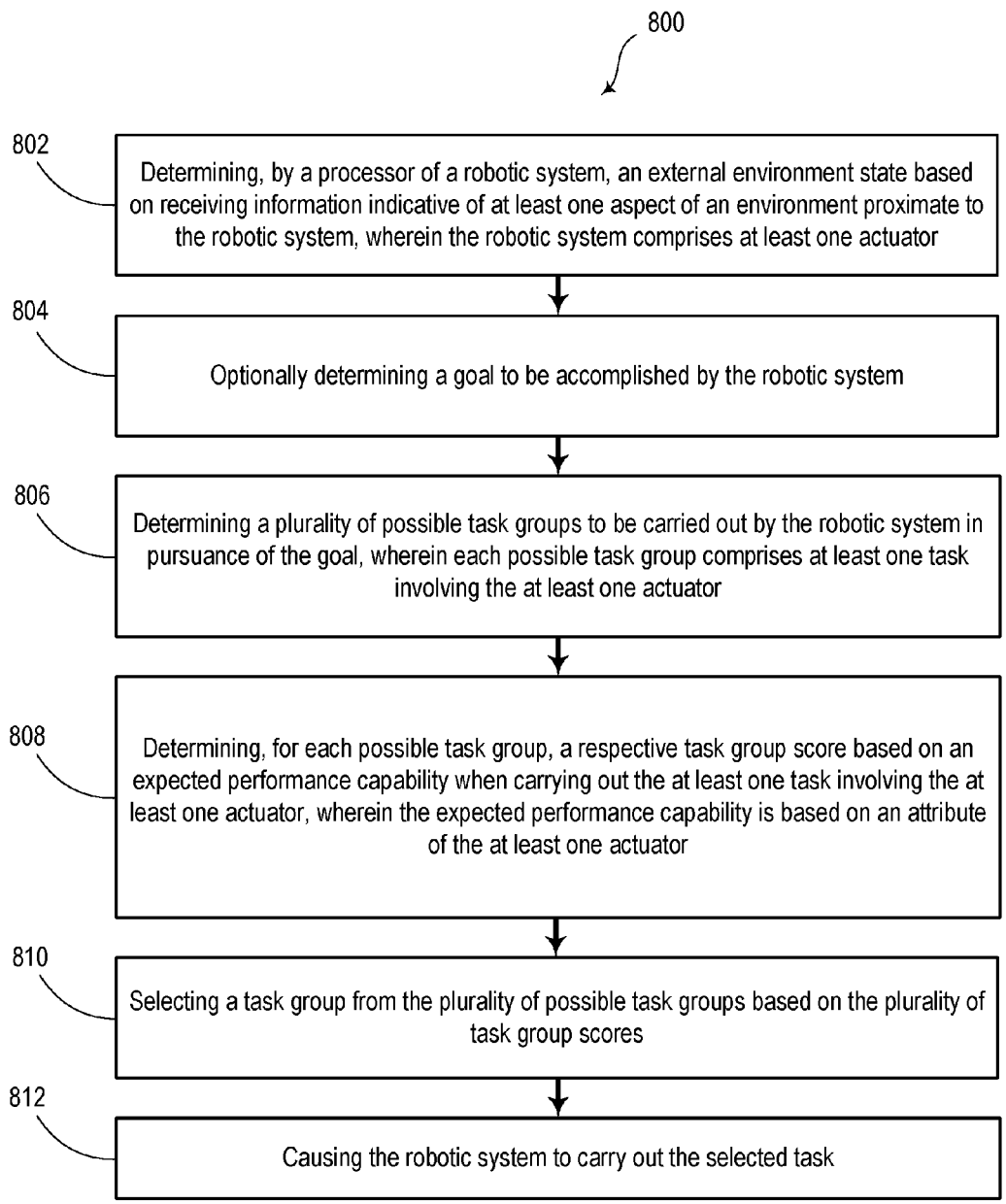
FIG. 8 illustrates a method, according to an example embodiment.

FIG. 8 illustrates a method 800, according to an example embodiment. The method 800 may include various blocks or steps. The blocks or steps may be carried out individually or in combination. The blocks or steps may be carried out in any order and/or in series or in parallel. Further, blocks or steps may be omitted or added to method 800.

Some or all blocks of method 800 may involve elements of robotic systems 100, 200, 300, and/or 400 as illustrated and described in reference to FIGS. 1, 2, 3, and 4. For example, some or all of the blocks of method 800 may be executed by controller 150 and/or processor 152 as illustrated and described in reference to FIG. 1.

Block 802 includes determining an external environment state based on receiving information indicative of at least one aspect of an environment proximate to a robotic system. In some embodiments, the at least one aspect of the environment proximate to the robotic system may include at least one of: an obstacle, an object, a living person, or an operating constraint.

Block 804 includes optionally determining a goal to be accomplished by the robotic system. In an example embodiment, the goal to be accomplished may be determined via a human input and/or a higher level computing process. It is understood that a wide variety of robotic control and/or decision-making processes may be involved in determining a goal to be accomplished by the robotic system. All such processes are contemplated herein.

Block 806 includes determining a plurality of possible task groups to be carried out by the robotic system in pursuance of the goal. Each possible task group includes at least one task involving at least one actuator of the robotic system.

Block 808 includes determining, for each possible task group, a respective task group score. The respective task group score may be based on an expected performance capability when carrying out the at least one task involving the at least one actuator. In an example embodiment, determining the respective task group score includes assigning a numerical value to the respective possible task group based on the respective expected performance capability. In some embodiments, the assignment of numerical values to the respective possible task groups may be performed according to a sum of squares algorithm. The expected performance capability may be based on the external environment state and an attribute of the at least one actuator. For example, the attribute of the at least one actuator may include a strength of the at least one actuator, a range of motion of the at least one actuator, an accuracy of the at least one actuator, or a speed of the at least one actuator.

Block 810 includes selecting a task group from the plurality of possible task groups based on the plurality of task group scores. For example, the selected task group may be determined based on having a lowest task group score or a highest task group score within the plurality of task group scores. The plurality of task groups scores may include a range of task group scores. In such a scenario, the selected task group may be assigned a task group score relatively greater or less than others in the plurality of task group scores.

Block 812 includes causing the robotic system to carry out the selected task.

In an example embodiment, the method may further include determining a robot state based on receiving information indicative of at least one aspect of the robotic system. In such a scenario, the expected performance capability may be further based on the robot state. In other words, the scoring of possible task groups may be based on a given state of the robot. The robot state may include a condition or mechanical pose of the robot. Additionally or alternatively, the robot state may be based on a current battery level of the robotic system. Other factors that may affect the robot state are possible and contemplated herein.

In some embodiments, determining the respective task group score may be additionally or alternatively based on a speed factor. In such a scenario, the speed factor may include at least one of: a duration of the possible task group or a route of the robotic system while carrying out the possible task group.

Additionally or alternatively, determining the respective task group score may be based on a safety factor. For example, the safety factor may include at least one of: a safety margin, a proximity to at least one bystander, or a stability of the robotic system while carrying out the possible task.

In some embodiments, determining the respective task group score may be based on a cost factor. For instance, the cost factor may include at least one of: an energy cost associated with the robotic system carrying out the possible task or a monetary cost associated with the robotic system carrying out the possible task.

The robotic system may be configured to improve task group selection and execution based on experience or other data. Accordingly, the determination of the at least one respective task score may be based on at least one of: a machine learning process or an empirical scoring process.

Some embodiments may include carrying out the method 800 at one or more periodic intervals of time, e.g. every 50 milliseconds. Additionally or alternatively, the method 800 may be carried out in response to a triggering condition. The triggering condition may include an environmental condition, a condition of the robotic system, or another type of trigger.

It is understood that the method 800 may be carried out, at least in part, by a variety of different robotic systems. For example, the method 800 may be carried out by a robotic system that includes four legs. In such a scenario, the robotic system may be arranged as a quadruped robot, e.g., robotic system 200 as described and illustrated in FIG. 2.

Alternatively, the method 800 may be carried out by a robotic system having two legs. For example, the robotic system may be arranged as a biped robot, e.g., robotic system 300 as described and illustrated in FIG. 3.

Yet further, the method 800 may be carried out by a robotic system having a wheeled base. For example, the robotic system may be arranged as a wheeled robot, e.g., robotic system 400 as described and illustrated in FIG. 4.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A robotic system comprising:
   at least one actuator;
   a memory configured to contain instructions; and
   a processor configured to execute the instructions to perform operations, the operations comprising:
   determining an external environment state from information indicative of at least one aspect of an environment proximate to the robotic system;
   determining a plurality of possible task groups to be carried out by the robotic system in pursuance of a task-oriented goal, wherein each possible task group comprises at least one task involving actuation of the at least one actuator;

determining, for each possible task group, a respective task group score based on:
an expected performance capability when carrying out the at least one task involving the at least one actuator, wherein the expected performance capability is based on the external environment state and an attribute of the at least one actuator, the attribute of the at least one actuator comprising at least one of a strength of the at least one actuator, a range of motion of the at least one actuator, or an accuracy of the at least one actuator;
a speed factor comprising an execution duration of the possible task group; and
a cost factor comprising at least one of an energy cost associated with the robotic system carrying out the possible task group;
selecting a task group from the plurality of possible task groups based on the plurality of task group scores; and
causing the robotic system to carry out the selected task group.

2. The robotic system of claim 1, wherein the at least one aspect of the environment proximate to the robotic system comprises at least one of: an obstacle, an object, a living person, or an operating constraint.

3. The robotic system of claim 1, wherein the operations further comprise determining a robot state based on receiving information indicative of at least one aspect of the robotic system, wherein the expected performance capability is further based on the robot state.

4. The robotic system of claim 1 further comprising a robotic appendage having at least one actuator, wherein the at least one actuator comprises a linear actuator or a rotational actuator, and wherein the robotic appendage comprises a robotic arm or a robotic leg.

5. The robotic system of claim 4 further comprising a first robotic appendage having a first actuator and a second robotic appendage having a second actuator, wherein determining the plurality of possible task groups comprises determining at least a first possible task group and a second possible task group, wherein the first possible task group comprises at least one task involving the first actuator, wherein the second possible task group comprises at least one task involving the second actuator, and wherein selecting the task group comprises selecting between at least a first task group score assigned to the first possible task group and a second task group score assigned to the second possible task group.

6. The robotic system of claim 1, wherein determining a plurality of possible task groups comprises determining at least a first possible task group and a second possible task group, wherein the first possible task group comprises at least one task involving a portion of the robotic system moving along a first plane of motion, wherein the second possible task group comprises at least one task involving the portion of the robotic system moving along a second plane of motion, and wherein selecting the task group comprises selecting between at least a first task group score assigned to the first possible task group and a second task group score assigned to the second possible task group.

7. The robotic system of claim 1, wherein determining the respective task group score comprises assigning a numerical value to respective possible task group based on the respective expected performance capability according to a sum of squares algorithm.

8. The robotic system of claim 1, wherein the speed factor comprises a route of the robotic system while carrying out the possible task group.

9. The robotic system of claim 1, wherein determining the respective task group score is further based on a safety factor, wherein the safety factor comprises at least one of: a safety margin, a proximity to at least one bystander, or a stability of the robotic system while carrying out the possible task group.

10. The robotic system of claim 1, wherein the cost factor comprises a monetary cost associated with the robotic system carrying out the possible task group.

11. The robotic system of claim 1, further comprising four legs, wherein the robotic system is arranged as a quadruped robot.

12. The robotic system of claim 1, further comprising two legs, wherein the robotic system is arranged as a biped robot.

13. A method comprising:
determining, by a processor of a robotic system, an external environment state from information indicative of at least one aspect of an environment proximate to the robotic system, wherein the robotic system comprises at least one actuator;
determining a plurality of possible task groups to be carried out by the robotic system in pursuance of a task-oriented goal, wherein each possible task group comprises at least one task involving actuation of the at least one actuator;
determining, for each possible task group, a respective task group score based on:
an expected performance capability when carrying out the at least one task involving the at least one actuator, wherein the expected performance capability is based on the external environment state and an attribute of the at least one actuator, the attribute of the at least one actuator comprising at least one of a strength of the at least one actuator, a range of motion of the at least one actuator, or an accuracy of the at least one actuator;
a speed factor comprising an execution duration of the possible task group; and
a cost factor comprising at least one of an energy cost associated with the robotic system carrying out the possible task group;
selecting a task group from the plurality of possible task groups based on the plurality of task group scores; and
causing the robotic system to carry out the selected task group.

14. The method of claim 13, wherein the at least one aspect of the environment proximate to the robotic system comprises at least one of: an obstacle, an object, a living person, or an operating constraint.

15. The method of claim 13, further comprising determining a robot state based on receiving information indicative of at least one aspect of the robotic system, wherein the expected performance capability is further based on the robot state.

16. The method of claim 13, wherein determining the respective task group score comprises assigning a numerical value to the respective possible task group based on the respective expected performance capability according to a sum of squares algorithm.

17. The method of claim 13, wherein the speed factor comprises a route of the robotic system while carrying out the possible task group.

18. The method of claim 13, wherein determining the respective task group score is further based on a safety factor, wherein the safety factor comprises at least one of: a safety margin, a proximity to at least one bystander, or a stability of the robotic system while carrying out the possible task group.

19. The method of claim 13, wherein the cost factor comprises a monetary cost associated with the robotic system carrying out the possible task group.

20. The method of claim 13, further comprising carrying out the method at a periodic interval of time.

21. The method of claim 13, wherein determining at least one respective task group score is further based on at least one of: a machine learning process or an empirical scoring process.

22. The method of claim 13, wherein the robotic system further comprises a first robotic appendage having a first actuator and a second robotic appendage having a second actuator, wherein determining the plurality of possible task groups comprises determining at least a first possible task group and a second possible task group, wherein the first possible task group comprises at least one task involving the first actuator, wherein the second possible task group comprises at least one task involving the second actuator, and wherein selecting the task group comprises selecting between at least a first task group score assigned to the first possible task group and a second task group score assigned to the second possible task group.

23. The method of claim 13, wherein determining the plurality of possible task groups comprises determining at least a first possible task group and a second possible task group, wherein the first possible task group comprises at least one task involving a portion of the robotic system moving along a first plane of motion, wherein the second possible task group comprises at least one task involving the portion of the robotic system moving along a second plane of motion, and wherein selecting the task group comprises selecting between at least a first task group score assigned to the first possible task group and a second task group score assigned to the second possible task group.

\* \* \* \* \*